Oct. 22, 1968  R. E. KENNEL  3,406,792
DISK BRAKE HOUSING STABILIZING MEANS
Filed Nov. 21, 1966
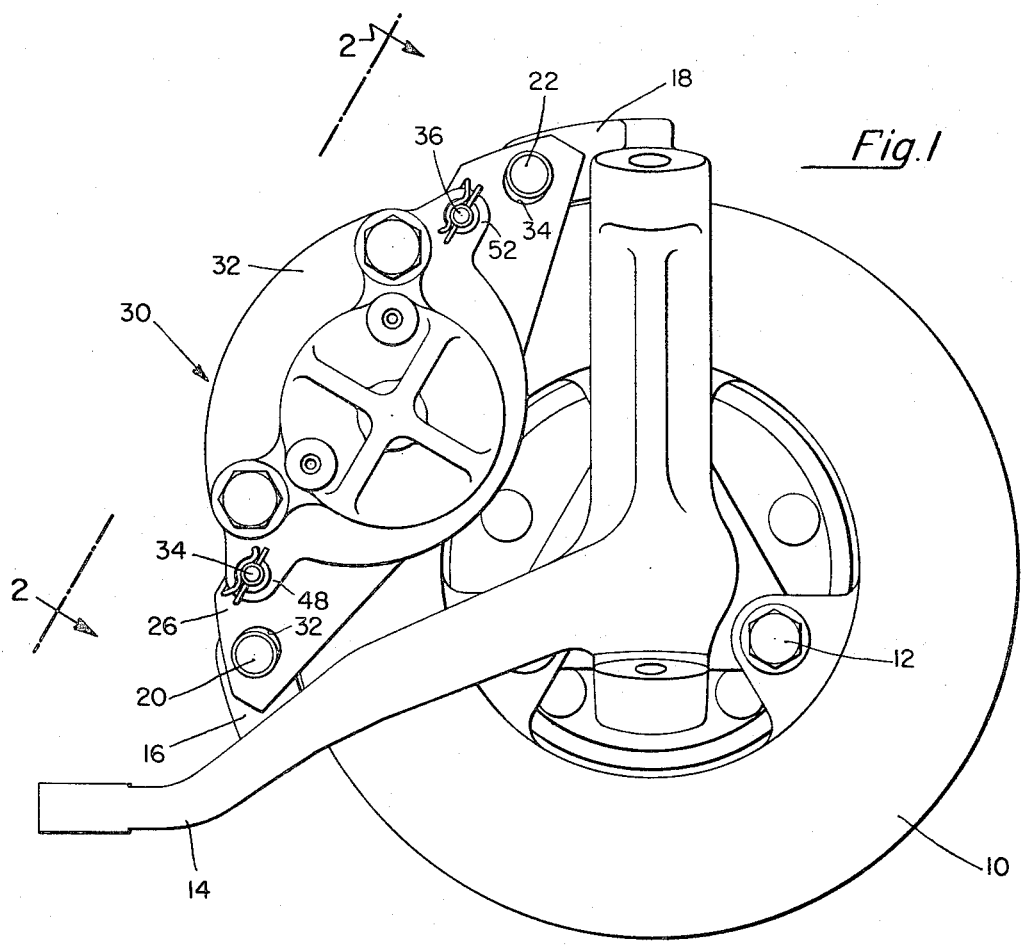
Fig.1
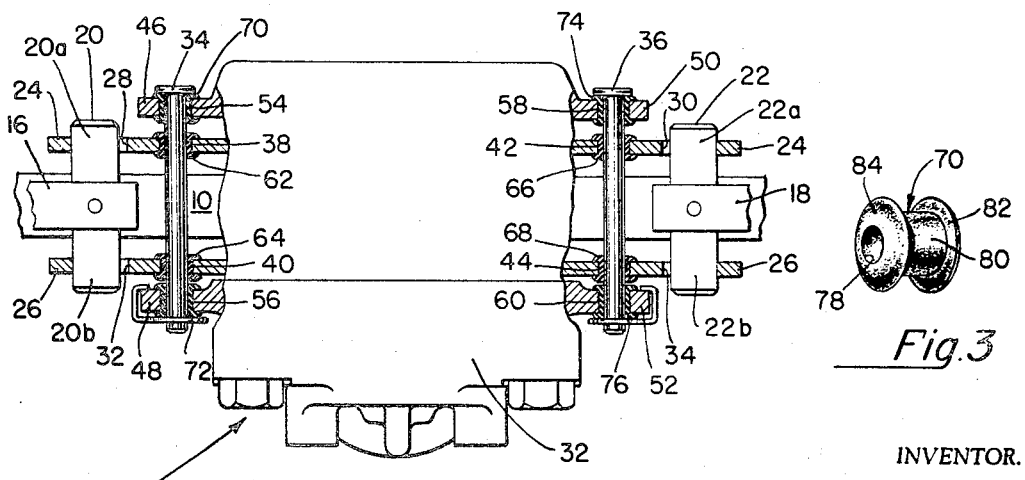
Fig.2
Fig.3
INVENTOR.
ROBERT E. KENNEL
BY
ATTORNEY United States Patent Office 3,406,792
Patented Oct. 22, 1968

3,406,792
DISK BRAKE HOUSING STABILIZING MEANS
Robert E. Kennel, Grosse Pointe, Mich., assignor to The Budd Company, Philadelphia, Pa., a corporation of Pennsylvania
Filed Nov. 21, 1966, Ser. No. 595,670
1 Claim. (Cl. 188—73)

ABSTRACT OF THE DISCLOSURE

A floating caliper disk brake assembly having a resilient mounting grommet for supporting the housing on the brake shoes and maintaining the brake pads in close proximity to the brake disk during deflection thereof by operation of the vehicle.

---

This invention relates to disk brakes and more particularly to an improvement in the mounting means of the housing in a floating caliper type disk brake as shown in the co-pending patent application for Caliper-Type Disk Brake, U.S. Ser. No. 420,867, filed Dec. 24, 1964, now Patent No. 3,298,468.

In floating caliper type disk brakes, the floating characteristic of the brake often results in loose fits due to wear during use or tolerance build-up in manufacturing which result in loose fits that cause undesirable noisy rattling of the brake assembly.

It is an object of this invention to provide a resilient mounting means for the brake structure that will reduce wear and cushion the contacts between the brake housing and supporting structure.

Another problem encountered in disk brake installation is that of "pad knock back" or depression of the piston in the actuation cylinder caused by spindle or axle deflection during normal operation of the vehicle. This problem is created by the disk which is mounted on a deflected spindle or axle pushing against an adjacent pad during such deflection which in turn slides on its mounting pins and pushes the piston into the cylinder, forcing hydraulic fluid back into the master cylinder. Thus there is "pedal loss" or excessive pedal travel is needed to re-supply the hydraulic fluid system to the actuating piston during the next application of the brakes.

Another object of this invention is to provide a resilient connecting or mounting means between the support pins and the brake pads and housing that will resist relative movement therebetween when the spindle or axle is deflected.

These and other objects will become more obvious by reference to the following specification and drawings wherein:

FIGURE 1 is a side elevational view of a floating caliper disk brake, utilizing the present invention, mounted adjacent the spindle arm of a vehicle front wheel, FIGURE 2 is a view in the direction of the arrows, substantially along line 2—2 of FIG. 1, with sections of the housing broken away to illustrate the positioning of the novel grommets for mounting the housing and brake pads on the supporting pin for resiliently restricting movement therebetween, FIGURE 3 is an isometric view of a mounting grommet.

Referring now to the drawings, as best seen in FIG. 1, a brake disk 10 is secured by bolts 12 or other suitable means for rotation with a vehicle wheel (not shown). The wheel and disk 10 are rotatably mounted on a spindle assembly 14 in a conventional manner. Support means 16, 18 are secured to the spindle assembly 14. Each support means 16, 18 includes a mounting pin 20, 22, secured at their mid-points to the respective supports and having end portions 20a, 20b, and 22a, 22b, respectively, for supporting a pair of brake shoes 24, 26 on opposite sides of the brake disk 10. Apertures 28, 30 and 32, 34 are formed in the respective brake shoes 24, 26 for locating and mounting the brake shoes on the end portions 20a, 20b, 22a, 22b of the mounting pins 20, 22 with a brake shoe adjacent each side of the brake disk 10.

Referring now to FIG. 2, the brake assembly indicated generally by the numeral 30 includes a housing 32 floatingly supported on the brake shoes 24, 26 by a pair of support pins 34, 36 which extend through apertures 38, 42 and 40, 44 respectively in the shoes 24, 26. Mounting tabs 46, 48 extend from one side of the housing 32 and mounting tabs 50, 52 extend from the other side of the housing. Apertures 54, 56, 58, 60 are formed in the respective mounting tabs for cooperating with the mounting pins 34, 36 whereby the housing 32 is floatingly mounted on the brake shoes.

Mounted within the housing 32 is a conventional hydraulically actuated piston for moving the friction surface of the brake shoes into contact with the brake disk in a conventional manner.

The structure thus far described is old in the art and comprises no part of this invention.

The improvement in the art consists of the insertion of resilient, elastic mounting means 62, 64, 66, 68, 70, 72, 74 and 76 within the respective apertures 38, 40, 42, 44, 54, 56, 58 and 60 for cushioning the support of the housing 32 on the brake shoes 24, 26 and for maintaining the brake shoes in close proximity to the brake disk.

As best seen in FIG. 3, each of the mounting means or grommets is formed preferably of a rubber or plastic compound and has a central aperture 78 for being positioned about the support pins 34, 36. The outer surface of the grommet is provided with a smaller diameter central area 80 for being positioned in the apertures 38, 40, 42, 44 of the brake shoe and the apertures 54, 56, 58, 60 of the housing tabs. A pair of larger diameter portions 82, 84 are formed at each end of reduced diameter area 82 for maintaining the grommet in position in the apertures of the brake shoes and housing tabs and to resist axial movement of the respective parts. The inner aperture 78 has a diameter smaller than the diameter of the support pins so that the grommets resist sliding on the pins but may be expanded, due to its elasticity, for mounting. The grommets may be moved axially on the pins by sufficient force but normal vibration will not cause them to move axially. By using the grommets to mount the housing on the pins, metal to metal contact between the housing and pins, and between the brake shoes and pins is eliminated, thus reducing noisy rattling from the assembly.

A second advantage derived from the grommets is obtained during operation of the vehicle. When sufficient side thrust is applied to the vehicle wheel causing the spindle or axle to deflect from its normal position, in the usual caliper disk brake, such deflection pushes against one of the brake shoes causing axial movement which forces the actuation piston back in its chamber causing the hydraulic fluid to flow back into the reservoir. Then on the next application of the brakes, the foot pedal must travel sufficient distance to re-supply the hydraulic chamber of the piston with fluid returned from the reservoir before braking action can begin in the normal manner. In a brake assembly using the present invention, such deflection of the brake disk would also bear against the brake shoe, but the brake shoes and housing would move as a unit on the mounting pins without depressing the piston in its chamber. Thus on the next application of the brakes, the hydraulic system, with the piston unmoved, performs in the normal manner without excessive pedal travel.

I claim:
1. In a disk brake assembly having an axially fixed rotatable disk, fixed mounting pins, a pair of axially movable brake shoes mounted on said mounting pins for axial movement thereon and being positioned axially spaced on each side of said disk, a housing supported solely on said brake shoes, a fluid motor in said housing for moving aid brake shoes axially on said mounting pins into contact with said disk on command and support pins extending between said brake shoes for mounting said housing thereon; the combination including a plurality of resilient elastic mounting grommets having a first set of grommets positioned about each of said support pins between said support pins and said brake shoes for cushioning the housing on said brake shoes and for maintaining said brake shoes adjacent said brake disk, a second set of grommets positioned about each of said support pins between said housing and said support pins for resiliently mounting said housing on said support pins; each of said grommets including a central aperture having a diameter smaller than the diameter of said support pins upon which it is positioned for providing a biasing force on said pin due to the required expansion during mounting thereof, an outer diameter portion having a diameter equal to the diameter of the associated apertures formed in said brake shoes and said housing, and outer radial portions extending from each end of said outer diameter portion having a greater diameter than said outer diameter portion and providing radially extending surfaces radiating from said outer surface for bearing against the sides of said housing and said brake shoes adjacent the apertures in which said grommets are positioned whereby the outer radial portions bearing against the adjacent housing and brake shoe prevent movement of the grommet relative to the respective housing and brake shoe.

References Cited

UNITED STATES PATENTS

| 3,199,635 | 8/1965 | Bessler et al. | 188—73 |
| 3,298,468 | 1/1967 | Buyze | 188—73 |
| 3,334,708 | 8/1967 | Swift | 188—73 |

FERGUS S. MIDDLETON, *Primary Examiner.*

GEORGE E. A. HALVOSA, *Assistant Examiner.*